United States Patent
Joyce (10) Patent No.: US 9,636,873 B2
(45) Date of Patent: May 2, 2017

(54) SOLID IMAGE APPARATUS WITH IMPROVED PART SEPARATION FROM THE IMAGE PLATE

(75) Inventor: Michael Joyce, Deadwood, SD (US)

(73) Assignee: B9CREATIONS, LLC, Rapid City, SD (US)

( * ) Notice: Subject to any disclaimer, the term of this patent is extended or adjusted under 35 U.S.C. 154(b) by 313 days.

(21) Appl. No.: 13/600,729

(22) Filed: Aug. 31, 2012

(65) Prior Publication Data

US 2013/0292862 A1    Nov. 7, 2013

Related U.S. Application Data (60) Provisional application No. 61/642,175, filed on May 3, 2012.

(51) Int. Cl.
| | |
|---|---|
| *B29C 67/00* | (2006.01) |
| *B33Y 30/00* | (2015.01) |
| *B33Y 40/00* | (2015.01) |
| *B29K 105/00* | (2006.01) |

(52) U.S. Cl.
CPC ...... *B29C 67/0096* (2013.01); *B29C 67/0066* (2013.01); *B29C 67/0085* (2013.01); *B29K 2105/0058* (2013.01); *B33Y 30/00* (2014.12); *B33Y 40/00* (2014.12)

(58) Field of Classification Search
CPC ........................ B29C 67/0066; B29C 67/0087
USPC ........ 264/308, 334, 401, 459, 497; 425/375, 425/174.4
See application file for complete search history.

(56) References Cited

U.S. PATENT DOCUMENTS

| | | | |
|---|---|---|---|
| 4,575,330 A | 3/1986 | Hull | |
| 5,094,935 A * | 3/1992 | Vassiliou | ............ B29C 67/0074 156/58 |
| 5,247,180 A | 9/1993 | Mitcham | |
| (Continued) | | | |

FOREIGN PATENT DOCUMENTS

WO    WO 2012/053895    *    4/2012    ............. B29C 67/00

OTHER PUBLICATIONS

Chi Zhou, "Development of a Multi-material Mask-Image-Projection-based Stereolithography for the Fabrication of Digital Materials," Paper, Aug. 2011, 16 pages, University of Southern California, Los Angeles, USA.

(Continued)

*Primary Examiner* — Jeffrey Wollschlager
*Assistant Examiner* — Armand Melendez
(74) *Attorney, Agent, or Firm* — Terry M. Sanks, Esq.; Beusse Wolter Sanks & Maire, PLLC (57) ABSTRACT

Devices, methods, and computer program products for facilitating the assembly of three-dimensional parts in a layer-wise fashion are disclosed, wherein separation forces between the assembler device and the parts are minimized at certain interfaces. Parts may be produced from polymers, photopolymers, metals, or other materials. In some aspects of the present disclosure, separation forces are minimized via the utilization of a cure inhibiting layer on a top surface of the image plate and via sliding the part from contact with a portion of the image plate having high elevation to above a portion of the image plate with low elevation. In some aspects, the assembler device further comprises a sweeper configured to expose the cure inhibiting layer to a source of cure inhibitor after a cure cycle.

20 Claims, 8 Drawing Sheets

(56) References Cited

U.S. PATENT DOCUMENTS

| | | | |
|---|---|---|---|
| 5,391,072 A * | 2/1995 | Lawton et al. | 425/174.4 |
| 6,942,830 B2 | 9/2005 | Mulhaupt | |
| 7,052,263 B2 | 5/2006 | John | |
| 7,195,472 B2 | 3/2007 | John | |
| 7,438,846 B2 | 10/2008 | John | |
| 7,636,610 B2 | 12/2009 | Schillen | |
| 7,690,909 B2 * | 4/2010 | Wahlstrom | 425/375 |
| 7,783,371 B2 | 8/2010 | John | |
| 7,790,093 B2 | 9/2010 | Shkolnik | |
| 7,831,328 B2 | 11/2010 | Schillen | |
| 7,845,930 B2 | 12/2010 | Shkolnik | |
| 7,892,474 B2 * | 2/2011 | Shkolnik et al. | 264/401 |
| 7,894,921 B2 | 2/2011 | John | |
| 7,962,238 B2 | 6/2011 | Shkolnik | |
| 8,003,040 B2 | 8/2011 | El-Slblani | |
| 8,110,135 B2 | 2/2012 | El-Siblani | |
| 8,126,580 B2 | 2/2012 | El-Siblani | |
| RE43,955 E | 2/2013 | Shkolnik | |
| 8,394,313 B2 | 3/2013 | El-Slblani | |
| 2009/0072450 A1 * | 3/2009 | Wallgren | B22F 3/004 264/462 |
| 2010/0051118 A1 * | 3/2010 | Nelson et al. | 137/539 |
| 2010/0283188 A1 * | 11/2010 | Rohner | A61C 13/0013 264/401 |
| 2011/0241947 A1 * | 10/2011 | Scott et al. | 343/700 MS |
| 2013/0337100 A1 * | 12/2013 | Costabeber | B29C 67/0062 425/174 |

OTHER PUBLICATIONS

Dhananjay Dendukuri, "Continuous-flow lithography for high-throughput microparticle synthesis," Article, Apr. 9, 2006, pp. 365-369, vol. 5 of Nature Materials, Nature Publishing Group, USA.

* cited by examiner

SOLID IMAGE APPARATUS WITH IMPROVED PART SEPARATION FROM THE IMAGE PLATE

CROSS-REFERENCE TO RELATED APPLICATIONS

This application claims the benefit of U.S. Provisional Patent Application No. 61/642,175, filed May 3, 2012, and entitled "Solid Image Apparatus With Improved Part Separation From The Image Plate", which is incorporated herein by reference.

FIELD OF THE DISCLOSURE

The present disclosure relates to production of three-dimensional objects and more particularly to assembling three-dimensional objects in a step-wise fashion.

BACKGROUND

Three-dimensional polymer parts can be produced via photopolymerization processes. In one such photopolymerization process, a digital, three-dimensional model of the part to be created is produced. This model is digitally broken into cross sections. A fluid medium capable of altering its physical state when exposed to specified intensities and wavelengths of light is placed upon a planar transparent image plate. An exemplary fluid medium such as a photopolymer resin is exposed to patterns of light representing successive adjacent cross sections of the part being produced. This results in the creation of a hardened polymer layer in the desired shape, attached to the image plate. This layer is then separated from the image plate. Subsequent adjacent cross sections are produced in the same manner and automatically integrated together to provide a step-wise, cross-sectional assembly of the part. The part is drawn away from the substantially planar, parallel surfaces of the fluid medium and image plate. This and similar processes are also known as "3D printing" and hereinafter shall be referred to as such.

Layer-wise assembler devices such as 3D printers are used to rapidly and autonomously produce parts based on computer input. Some 3D printers are used to produce runs of identical parts in the tens, hundreds, or thousands. Other 3D printer applications allow designers to rapidly prototype. That is, the 3D printer enables a designer to create a physical prototype of a desired part that was first digitally created in a computer aided design program. This can then be used to examine the efficacy of the design in the real world. In the preceding examples, uniform, rapid production on the order of minutes is sought. 3D printing machines are designed with this design parameter in mind. Operators of 3D printing machines must constrain the design of parts being produced by the 3D printer in order to allow the machine to quickly produce quality parts. If a design is provided which is outside of the 3D printer's operating parameters, inconsistent parts may be produced.

When a cross-sectional layer is formed on the image plate, the newly-formed layer often adheres strongly to the image plate. Two types of forces prevent separation at the interface between the image plate and the newly-formed layer: (1) the adhesion force between the image plate and the newly-formed layer; and (2) a vacuum force present between planar objects in a fluid. The adhesion force is comprised of chemical bonding forces between the image plate and the newly-forced layer. In some aspects, the adhesion force also comprises mechanical adhesion forces between the image plate and the newly-formed layer. In order to separate the part from the image plate and continue assembling it, a separation force must be applied in order to overcome the adhesion and vacuum forces present.

Application of the separation force stretches and strains the part being formed in non-uniform, undesirable ways. In some 3D printers, the separation force is strong enough to distort or destroy fragile portions of a part because the fragile portion is stretched, strained, and even completely separated from the part as the construction plate and part are repositioned relative to one another in order to form the next layer of the part. Because this separation force destroys or damages fine detailing in a desired part design, the resolution of 3D printers has been limited. Parts containing, for example, very thin segments or intricate detailing (e.g., channels, tubing, and the like) cannot be produced, are produced with an extremely high failure rate, or must be produced at a very slow rate using different photopolymers in order to produce a part containing fragile sections that will not deform when exposed to the separation forces produced by the 3D printer.

Previous 3D printers have simply pulled the part away from the image plate. Application of significant separation force, however, causes the formed layer to be deformed or to break when the part is repositioned. Other approaches seek to minimize adhesion forces by applying an inert layer between the image plate and the newly-formed layer, such as the Teflon® material available from E.I. du Pont de Nemours and Company of Wilmington, Del. These approaches lessen the separation force by reducing adhesion forces, but do not mitigate the vacuum force.

SUMMARY

This Summary is provided to introduce a selection of concepts in a simplified form that are further described below in the Detailed Description. This Summary is not intended to identify key features or essential features of the subject matter to be claimed, nor is it intended to be used to limit the scope of the subject matter to be claimed.

This disclosure addresses the above-described needs by providing improved methods of separating the part being formed from the image plate of an assembly device, such as a 3D printer. More specifically, a device for producing three-dimensional polymer parts by step-wise creation and bonding of cross sections of the desired part is disclosed, wherein the separation force between a newly-formed cross section of the part and the image plate is minimized. The formed part may be comprised of a photopolymer made from exposing photopolymer resin to specified patterns of light shown on the image plate. Images of cross sections of the part being produced are projected onto the image plate, causing an adjacent volume of the photopolymer resin to cure and harden. One end portion (i.e., the distal portion) of this newly-formed layer is located some distance above the image plate and chemically bonds to the previously-formed layers of the part being formed. Another end portion of the newly-formed layer forms against the planar surface of the image plate (i.e., the proximal portion).

In an aspect of the present disclosure, the image plate of a desired length and width is located in a reservoir of photopolymer resin. In such aspect, the reservoir may be an acrylic rectangular box having a width sufficiently greater than the image plate's width in order to contain the image plate, a length at least twice the length of the image plate, and a depth sufficient to submerge the image plate in a layer of photopolymer resin. The image plate is located on one end of the reservoir, such that a shallow end and a deep end of the reservoir are created. The image plate is comprised of a support layer and a cure inhibiting layer. Within the reservoir, the cure inhibiting layer is exposed to the photopolymer resin on one planar side and is in contact with the support layer on another planar surface. The support layer is comprised of a planar transparent surface. A light source projects the desired cross section image on the planar side of the support layer not in contact with the cure inhibiting layer. Because the support layer and the cure inhibiting layer are substantially transparent, the cross section image is transmitted to the photopolymer resin, where a volume of the resin hardens into the desired shape.

In an aspect of the present disclosure, the separation force between the proximal portion and the image plate overcomes two major groups of forces—adhesion and vacuum forces—which arises when two planar objects are in contact with one another in a liquid. Adhesion forces are minimized by aspects of the present disclosure via the use of a cure inhibiting layer. The cure inhibiting layer is comprised of a material which inhibits the curing of the photopolymer near the surface of the cure inhibiting layer. In some aspects, the cure inhibiting layer is comprised of polydimethylsiloxane (PDMS) and oxygen. This cure inhibition forms a layer of liquid photopolymer resin between the image plate and the part being formed, thereby eliminating the adhesion forces that normally bind the part and the image plate. Once a layer of the part has formed, the vacuum force is minimized by sliding the image plate horizontally. This horizontal sliding, rather than pulling the part away from the image plate, minimizes the vacuum force that counteracts pulling apart two planar surfaces in a liquid. Horizontal sliding minimizes the separation force required to counteract the vacuum force.

In another aspect of the present disclosure, the assembler device replenishes a cure inhibitor, such as oxygen, contained in the cure inhibiting layer, such as PDMS, after each cure cycle. The assembler device further comprises a sweeper having a first portion and a second portion, the sweeper is positioned across the cure inhibiting layer such that a portion of the cure inhibiting layer passes below the sweeper as the image plate slider horizontally, removing the part from the image plate. The sweeper is configured such that the second portion of the sweeper is in contact with the cure inhibiting layer and exposes a portion of the cure inhibiting layer to the surrounding atmosphere as that portion goes past the sweeper. The sweeper also serves to stir the resin contained within the reservoir. Such stirring is advantageous especially where the resin comprises suspended particles (e.g., pigments, metal powders, and the like) which may settle to the bottom if the resin is not stirred. The sweeper may also be configured to remove or sweep away contaminants from the surface of the cure inhibiting layer. Such contaminants may be particles of cured resin, dirt, and other debris.

BRIEF DESCRIPTION OF THE DRAWINGS

The features and advantages of the present disclosure will become more apparent from the detailed description set forth below when taken in conjunction with the drawings in which like reference numbers indicate identical or functionally similar elements.

DETAILED DESCRIPTION

The present disclosure is directed to assembling three-dimensional parts in a layer-wise fashion wherein separation forces between the assembler device and the part are minimized at certain interfaces. Assembler devices construct three-dimensional parts in a layer-wise fashion wherein a layer has a cross-section and a thickness. The part may be produced from polymers, metals, or other materials. In some aspects of the present disclosure, the part is produced by curing successive layers of photopolymer resin.

Assembler devices such as 3D printers cannot produce parts with fine detail because vacuum and bonding forces prevent removal of a newly created layer without the application of a strong separation force which may rip, distort, or otherwise destroy fine detailing in the part being created. The vacuum force holding the part to the image plate may be overcome by sliding the image plate along an axis parallel to the top surface of an image plate in accordance with an aspect of the present disclosure, as disclosed herein.

The utilization of a cure inhibiting layer placed upon the image plate may reduce the required separation force required for removing recently created layers of a part. The cure inhibiting properties of the cure inhibiting layer may be maintained by passively or actively supplying a cure inhibitor such as oxygen to the cure inhibiting layer. Utilization of a cure inhibiting layer in combination with sliding the image plate along an axis parallel to the top surface of the image plate reduces the separation forces required for removing newly created layers of a part from the image plate such that parts may be created with finer detail than previous assembler devices.

Figure 1:
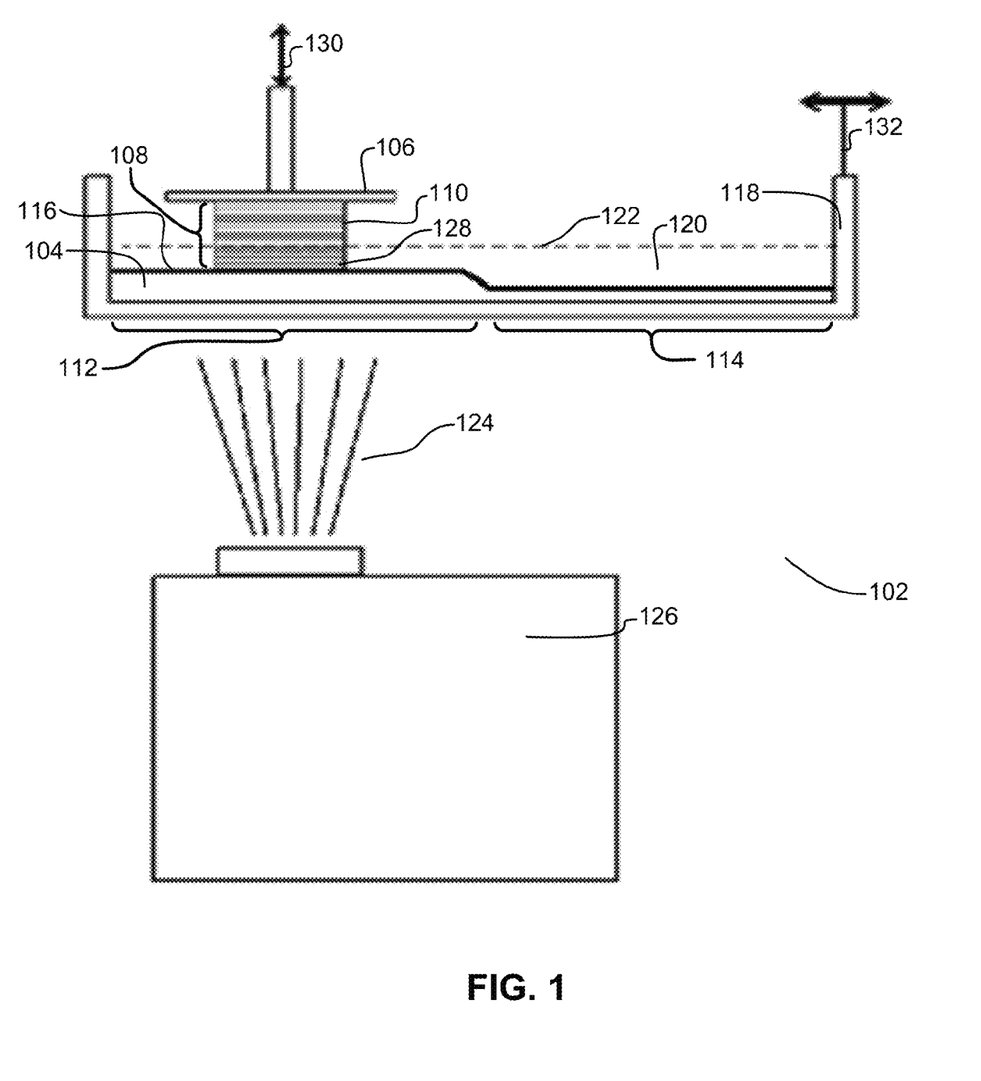
FIG. 1 is a schematic cross section side view of a 3D printer assembler device, in accordance with an aspect of the present disclosure.

Referring to FIG. 1, a schematic cross section side view of a 3D printer assembler device 102, in accordance with an aspect of the present disclosure, is shown.

Assembler device 102 comprises an image plate 104 and a build table 106, configured to facilitate layer-wise construction of three-dimensional parts 108 wherein a layer 110 has a cross-section and a thickness.

Image plate 104 has an area of high elevation 112 and an area of low elevation 114. Image plate 104 may be constructed of glass, metal, plastic, or any other alternative material as will become apparent to those having skill in the relevant art(s) upon reading the description herein. Image plate 104 is configured to facilitate construction of part 108 on a surface 116 of image plate 104. Surface 116 may be a top portion of image plate 104, as depicted in FIG. 1.

Assembler device 102 may construct parts 108 by forming (as through curing, for example) and assembling layers 110 of thickness, t. Low elevation area 114 may be a thickness t lower than high elevation area 112. In another aspect, low elevation area 114 is more than one thickness t lower than high elevation area 112, such as 3 mm lower. Layer thickness t may be the maximum thickness of layer 110 assembler device is capable of producing for a desired minimum part 108 resolution. Part resolution defines the minimum size a feature may be on part 108.

Build table 106 is configured to support part 108 as part 108 is being constructed. Build table 106 may comprise a planar portion adjacent to image plate 104. A first layer 110 of part 108 may be formed on the planar portion of build table 106. Subsequent layers 110 may be formed and attached to a previous layer 110, forming part 108 in a layer-wise fashion. Build table 106 may be configured to alter the position of part 108. Build table 106 may further comprise a vertical actuator 130 configured to alter the vertical position of build table 106 and the attached part 108 being formed. Actuator 130 may raise or lower build table 106 and the attached part 108 a distance equal to the thickness, t, of a new layer 128 being formed. Actuator may alter the vertical position of build table 106 some other distance. Raising build table 106 a distance t facilitates creation of a new layer 128 of thickness t which may attach to the build table 106 or previously cured layer 110. Actuator 106 may also raise a completed part 108 to a position suitable for removal from assembler device 102. Build table 106 may also be configured to allow manual position manipulation. For example, build table 106 may be raised by hand to a position suitable for removal of a completed part 108.

Actuator 130 may lift build table 106 and attached part 108 a height greater than t. In some aspects, lifting build table 106 greater than height t allows resin 120 to flow more quickly into the volume between part 108 and image plate 104.

Figure 2:
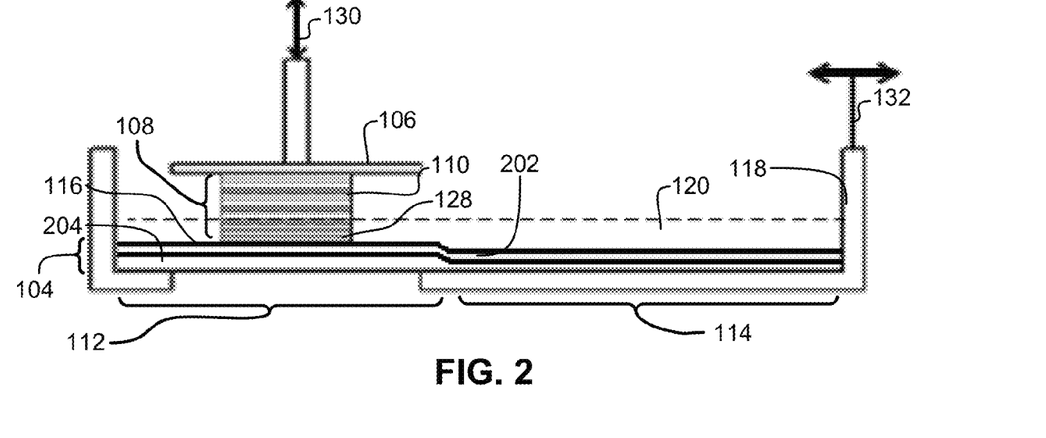
FIG. 2 is a schematic cross section of an assembler device, in accordance with an aspect of the present disclosure.

In an aspect where cure inhibiting layer 202 has some flexibility, actuator 130 may lower part 108 some distance, such as thickness t, into cure inhibiting layer 202, compressing cure inhibiting layer 202. This compression may forth excess resin 120 from between part 108 and cure inhibiting layer 202, facilitating the creation of a desired new layer 128 thickness. The compression may also reduce bonding forces between new layer 128 and cure inhibiting layer 202.

Assembler device 102 may be configured as sterolithographic or photolithographic device (e.g., a 3D printer) for constructing three-dimensional parts 108 from photopolymer resin 120 by curing selected portions of liquid resin 120 in a layer-wise fashion via exposure to light wherein layer 110 has a cross-section and a thickness. Assembler device 102 may further comprise a light source 126 having an output directed toward the bottom portion of the image plate 104, configured to cure successive layers of the part by projecting images 124 corresponding with the cross-section of each successive layer. Projector 126 may be connected to assembler device via adjustable mounts.

Image plate 104 may be constructed such that cure surface 116 is exposed to resin 120. Light source 126 (e.g., a projector, a laser, and the like) projects an image 124 of the desired cross-section onto a portion of image plate 104 opposite resin 120. At the portion of image plate receiving light from light source 126, image plate and other portions of assembler device 102 (e.g., reservoir 118, support plate (not shown in FIG. 1), cure inhibiting layer (not shown in FIG. 1), and the like) are substantially transparent permitting the cross section image 124 to be transmitted to resin 120, where a volume of the resin irradiated by the light hardens into the desired new layer 128. In some aspects, assembler device 100 produces parts to a resolution of 50 to 100 microns.

Successive layers 110 may be added to part 108 when part 108 is adjacent to a specific portion of image plate 104. A portion of high elevation area 112 may be transparent and configured to allow light to pass through a bottom portion of high elevation area 112 to surface 116 of high elevation area 112 where new layer 128 of liquid resin 120 may be cured by the light, adding new layer 128 to part 108.

Thus when light source 126 sends an image 124, it irradiates a thin layer of resin 120 trapped between surface 116 and build table 106, or a part layer 110. This irradiation cures and hardens new layer 128 causing new layer 128 to attach to build table 106 or part 108 being constructed.

Assembler device 102 may additionally comprise reservoir 118. Reservoir 118 may be configured to hold a desired volume of resin 120, such as a photopolymer resin suitable for 3D printing. The volume of resin 120 may fill reservoir 118 to a desired fill line 122 (shown as a dashed line in FIG. 1). Reservoir 118 may be at least partially constructed transparent material, such as acrylic. Reservoir 118 may be made of glass, metal, plastic, or another material suitable for containing photopolymer resin 120. Reservoir comprises a base. The base may further comprise image plate 104. Where assembler device 102 is a photolithographic device, reservoir 118 and image plate 104 are configured to allow light to pass from light source 126 to image plate surface 116, where new layer 128 of part 108 is created via curing.

Image plate 104 is configured to slide between a position where part 108 is over high elevation area 112 to a position where part 108 is over low elevation area 114. In an aspect, new layers 128 are added when part 108 is in a position over high elevation area 112. Part 108 may be repositioned via horizontal translation. Horizontal translation of part 108 minimizes the vacuum force preventing separation of part 108 from image plate 104.

Assembler device 102 may further comprise an actuator 132. Actuator 132 is configured to alter the position of image plate 104. Actuator 132 may be directly attached for movement to image plate 132. In another aspect where reservoir 118 base comprises image plate 104, actuator 132 is connected to reservoir 118 for movement. Actuator 132 may be configured to slide image plate 104 between a position where part 108 is over high elevation area 112 to a position where part 108 is over low elevation area 114.

After new layer 128 has formed, reservoir 118 may be translated horizontally via actuator 132 until part 108 is in a position where part 108 is over low elevation area 114. Build table 106 may be raised by actuator 130 a distance equal to the thickness of layer 110. After reaching a new height suitable for creating and bonding another layer 110 to part 108 being constructed, reservoir 118 is repositioned such that build table 106 and part 108 are above high elevation area 112. This cycle is then repeated until part 108 is fully formed. In some aspects, the height suitable for creating and bonding another layer 110 to part 108 being constructed is a distance equal to the thickness of layer 110. In other aspects, the height is some other distance.

In an alternative aspect, build table 108 is configured to slide between a position where part 108 is over high elevation area 112 to a position where part 108 is over low elevation area 114. In an aspect, new layers 128 are added to part when part 108 is in a position over high elevation area 112. Part 108 may be repositioned via horizontal translation. Horizontal translation of part 108 minimizes the vacuum force preventing separation of part 108 from image plate 104. Built table translation may be facilitated by actuator 130.

Resin 120 level may be monitored. The amount build table 106 raises part 108 may be limited to a distance that will not completely remove part 108 from resin 120 while it is being formed.

The height of build table 106 may be controlled electronically. A computer may estimate the level of resin 120 remaining in reservoir 118 and raise build table 106 a maximum distance which will not completely remove part 108 being constructed from resin 120 while it is being constructed. This estimation is performed by determining the volume of resin 120 used in producing part 108 as part 108 is being formed, calculating the resin 120 level drop in the reservoir 118, and subtracting the resin 120 level drop from the initial resin 120 level. After reaching a new height suitable for creating and bonding another layer 102 to part 108 being constructed, reservoir 118 is repositioned such that build table 106 and part 108 are above image plate 108. This cycle is then repeated until part 108 is fully formed.

Now referring to FIG. 2, a schematic cross section of an assembler device 102, in accordance with an aspect of the present disclosure, is shown.

Assembler device 102 may further comprise cure inhibiting layer 202. Cure inhibiting layer 202 is configured to prevent curing or hardening of an adjacent volume of resin 120. Cure inhibiting layer 202 is positioned adjacent to liquid resin 120 in an area where new layers 128 are formed (e.g., high elevation area 112). Cure inhibiting layer 202 may prevent an adjacent volume of resin 120 from curing even where conditions exist under which resin 120 would normally cure. Image plate 104 may further comprise Cure inhibiting layer 202. Surface 106 of image plate may be cure inhibiting layer 202.

Cure inhibiting layer 202 may be a rigid or flexible material configured to reduce bonding forces between new layer 128 and cure inhibiting layer 202. Cure inhibiting layer 202 may reduce bonding forces between new layer 128 and cure inhibiting layer 202 by inhibiting the curing of resin 120 (e.g., photopolymer resin) in close proximity to cure inhibiting layer 104. Cure inhibiting layer 202 may be comprised of a material that will, in combination with an ion or free radical, inhibit the curing of a microscopic layer of resin 120 adjacent to cure inhibiting layer 202.

Cure inhibiting layer 104 may be comprised of polydimethylsiloxane (PDMS). For durability (i.e., to avoid tearing) and to allow multiple parts to be produced without replacing or repairing cure inhibiting layer 202, cure inhibiting layer 202 comprising PDMS may be at least 1 mm thick.

Image plate 104 may comprise support plate 204 and cure inhibiting layer 202. Support plate 204 is configured to reinforce sure inhibiting layer 202.

Reservoir 118 comprises a base. Base may further comprise image plate 104. Image plate 104 is comprised of a cure inhibiting layer 202 and a support plate 204.

On the side of reservoir 118 facing projector 126 there may be an opening which defines the area projector may output image 124 on. The opening is located on one half of the bottom portion of reservoir 118 corresponding with high elevation area 112, where new layer 128 are added to part 108. This opening is sealed with image plate 104.

An additional sealing layer (not shown) may be placed between support plate 204 and reservoir 118 in order to ensure a leak-free seal. This sealing layer may be made of silicone, rubber, or other suitable materials apparent to those having ordinary skill in the relevant art(s).

Cure inhibiting layer 202 is placed on top of support plate 204. Cure inhibiting layer 202 may be deposited onto support plate 204 and then bonded to support plate 204 via heat treatment. Cure inhibiting layer 202 may also applied to support plate 204 constructed of glass via spin coating. Additionally, cure inhibiting layer 202 may be deposited onto support plate 204 via open mold oven cured methods. Support plate 204 comprised of acrylic or glass is suitable for an open mold oven cured deposition method.

Figure 4:
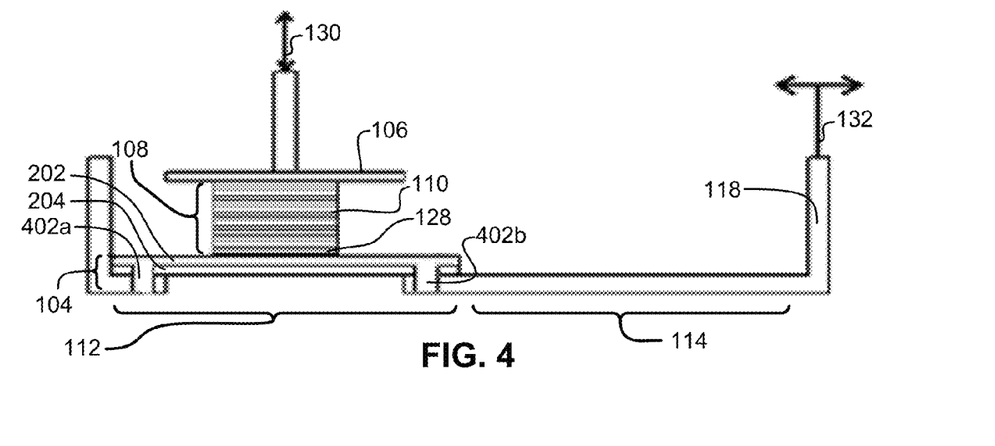
FIG. 4 is a schematic cross section of an assembler device comprising channels, in accordance with an aspect of the present disclosure.

Channel 402 or another portion of cure inhibiting layer 202, such as surface 116, may exposed to a volume of cure inhibitor which diffuses into cure inhibiting layer 202. The cure inhibitor comprises an ion or free radical. The cure inhibitor may be oxygen. Cure inhibiting layer 202 and support plate 204 are constructed such that there exists a surface 116 which is in contact with liquid resin 120 one side. Cure inhibiting layer 202 and support plate 204 are constructed such that at least one channel 402 is in contact with atmosphere containing a cure inhibitor which can permeate the cure inhibiting layer 202.

The cure inhibitor diffuses through cure inhibiting layer 202 such that it bonds with resin 120 at surface 116 of cure inhibiting layer 104. This bonding of cure inhibitor and resin inhibits the cure of resin 120 in a microscopic layer on surface 105 of cure inhibiting layer 104. Thus when projector 126 sends an image 124, it irradiates a thin layer of resin 120 trapped between cure inhibiting layer surface 116 and build table 106, or the most recently-cured layer 110. This irradiation cures and hardens a new layer 128, attached to the build table 106 or previously-cured layer 110 but with a microscopic, uncured, lubricating layer of resin 120 between new layer 128 and cure inhibiting layer surface 116.

After the new layer 128 has formed, reservoir 118 is translated horizontally via actuator 132 until build table 106 and part 108 are located over the low elevation area 114. The uncured resin 120 layer at least partially lubricates this horizontal translation. Actuator 130 then raises build table 106. After reaching a new height suitable for creating and bonding another layer 110 to part 108 being constructed, reservoir 118 is repositioned such that build table 106 and part 108 are above image plate 104 where an additional layer 110 may be added to part 108 (e.g., high elevation area 112). This cycle is then repeated until part 108 is fully formed.

The height suitable for creating and bonding another layer 110 to part 108 being constructed may be a distance equal to the thickness of layer 110. In other aspects, actuator 130 moves part 108 some other distance.

Figure 3:
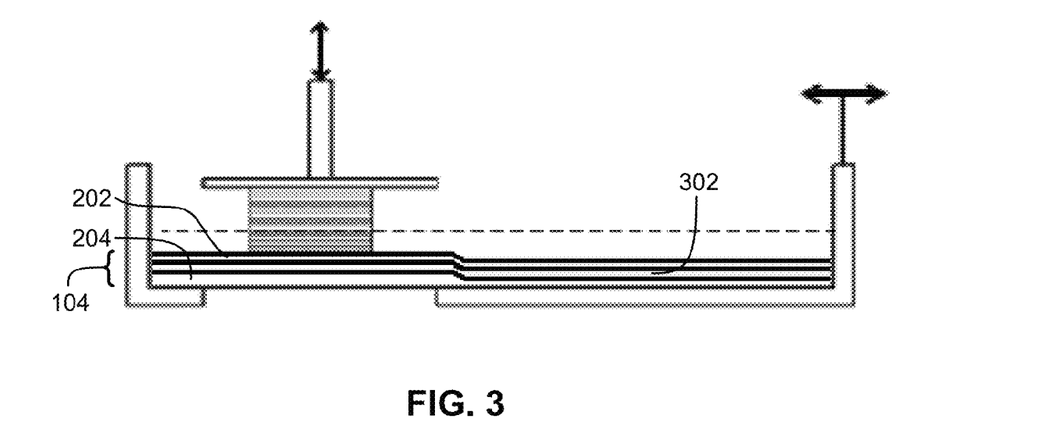
FIG. 3 is a schematic cross section of an assembler device comprising a primer layer, in accordance with an aspect of the present disclosure.

Referring now to FIG. 3, a schematic cross section of assembler device 102 comprising a primer layer 302, in accordance with an aspect of the present disclosure, is shown.

Application of cure inhibiting layer 202 may be facilitated by the application of a primer layer 302 between cure inhibiting layer 202 and other portions of image plate 104. Primer layer 302 may increase the durability of cure inhibiting layer 202 by providing an increased retaining force between cure inhibiting layer 202 and other portions of image plate 104. Primer layer 302 may also facilitate removal of portions of cure inhibiting layer 202 when it is desirable to reapply cure inhibiting later 202 (as where cure inhibiting layer 202 has become worn from use or damaged).

Referring now to FIG. 4, a schematic cross section of assembler device 102 comprising channels 402, in accordance with an aspect of the present disclosure, is shown.

In some aspects, a portion of the base of reservoir 118 comprises image plate 104. Image plate 108 comprises cure inhibiting layer 104 and support plate 204. Image plate 108 also comprises high elevation area 112 and covers approximately one half of reservoir.

Low elevation area 114, the portion of reservoir 118 bottom not covered by image plate 108, is a depth d deeper than the surface of image plate 108. In some aspects d is the thickness of image plate 108. In other aspects, d is greater or equal to the thickness of one layer 110 of part 108.

In some aspects, after new layer 128 has formed, actuator 132 repositions reservoir 118 relative to part 108 such that the portion of reservoir 118 under part 108 does not contain cure inhibiting layer 104. The microscopic uncured resin layer between cure inhibiting layer 202 and part 108 at least partially lubricates this horizontal translation, reducing the force needed to separate part 108 from image plate 104. Actuator 130 then raises build table 106 a distance equal to the thickness of layer 110. After reaching a new height suitable for creating and bonding another layer 110 to part 108 being constructed, reservoir 118 is repositioned such that build table 106 and part 108 are above image plate 104. This cycle is then repeated until part 108 is fully formed. In some aspects, the height suitable for creating and bonding another layer 110 to part 108 being constructed is a distance equal to the thickness of layer 110. In other aspects, part 108 is moved some other distance.

Image plate 104 or portions thereof may be secured via physical interlocks. In FIG. 4, cure inhibiting layer 202 is secured to other portions of assembler device 102 via channels 402. Channel 402 is a pathway allowing a portion of cure inhibiting layer 202 to insertably connect to other portions of assembler device 102, such as support plate 204 or reservoir 118. Channel 402 may interlock layers of image plate and prevent cure inhibiting layer 202 from sliding during part 108 production.

As shown in FIG. 4, channel 402 may also be configured to expose portions of cure inhibiting layer 202 to the surrounding atmosphere, or provide an interface for the atmosphere or a cure inhibitor such, as oxygen, to be fed into cure inhibiting layer 202.

Channel 402 may exposed to a volume of cure inhibitor which diffuses into cure inhibiting layer 104. Cure inhibiting layer 104 and support layer 106 are constructed such that there exists a surface 116 which is in contact with liquid resin 120 one side. Cure inhibiting layer 104 and support layer 106 are constructed such that at least one channel 402 is in contact with atmosphere containing a cure inhibitor which can permeate the cure inhibiting layer 202. The cure inhibitor diffuses through cure inhibiting layer 202 such that it bonds with resin 120 at surface 116 of cure inhibiting layer 202. This bonding of cure inhibitor and resin inhibits the cure of resin 120 in a microscopic layer on surface 116 of cure inhibiting layer 202.

Figure 5A:
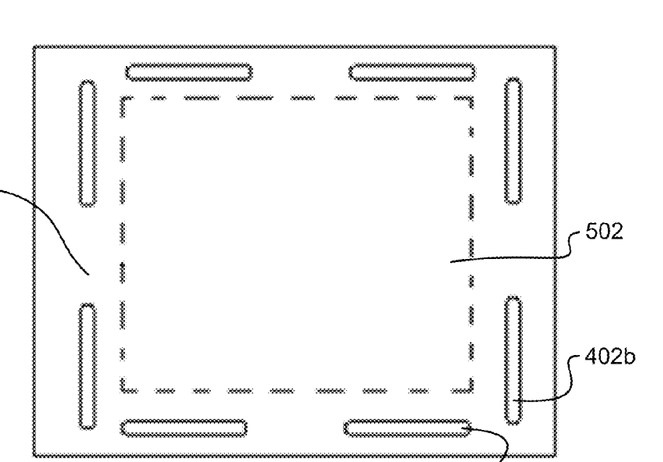
FIG. 5A is a schematic bottom view of a cure inhibiting layer, in accordance with an aspect of the present disclosure.

Referring to FIG. 5A, a schematic bottom view of cure inhibiting layer 202, in accordance with an aspect of the present disclosure, is shown.

In this aspect, projector 126 shines an image 124 of the desired cross section of layer 128 being shown into an image area 502 (shown as a dashed box in FIG. 5A). The dimensions of parts 108 the assembler device 102 may produce are limited by the size of image area 502. Multiple channels 402 (shown, for clarity, only as channels 402a-b in FIG. 5A) extend from cure inhibiting layer 202 through support plate 204 to physically lock cure inhibiting layer 202 to support plate 204 and reservoir 118. Channels 402 may also pass around the sides of support plate 204 and maintain the position of cure inhibiting layer 202 via physical contact.

Figure 5B:
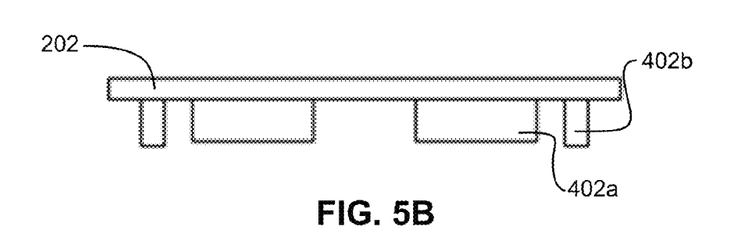
FIG. 5B is a schematic side view of a cure inhibiting layer, in accordance with an aspect of the present disclosure.

Referring to FIG. 5B, a schematic side view of cure inhibiting layer 202, in accordance with an aspect of the present disclosure, is shown.

Channels 402 (shown, for clarity, only as channels 402a-b in FIG. 5A) of the cure inhibiting later 402 may extend a sufficient distance to be placed into contact with a quantity of cure inhibitor. This cure inhibitor permeates cure inhibiting layer 402. The length of channels 402 may be sufficient to pass through support plate 204 and the base of reservoir 118, where channel 402 is exposed to an atmosphere containing, for example, oxygen.

Figure 6:
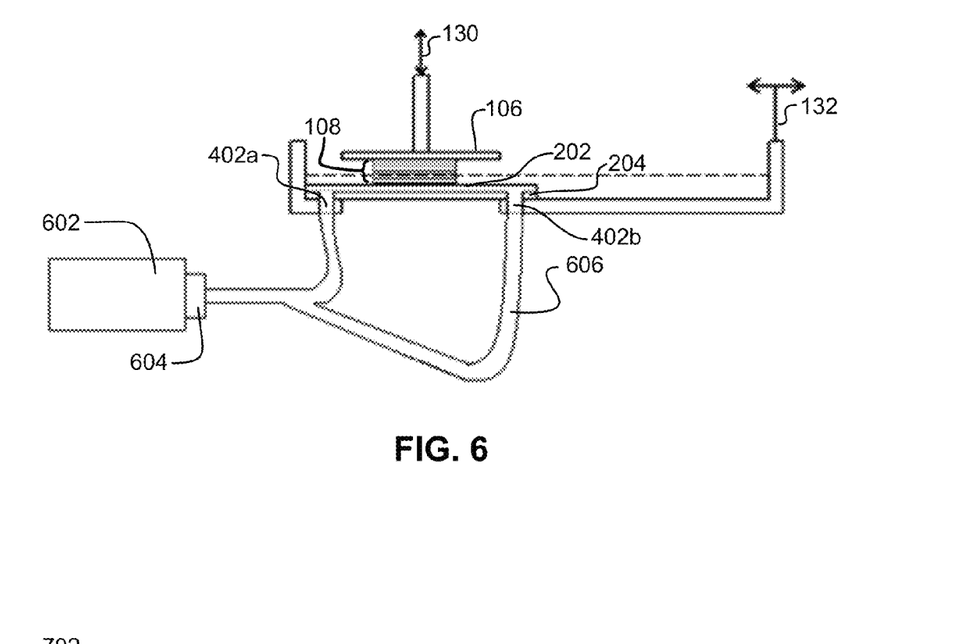
FIG. 6 is a schematic side view of an assembler device comprising a cure inhibitor source, in accordance with an aspect of the present disclosure.

Referring now to FIG. 6, a schematic side view of assembler device 102 comprising a cure inhibitor source 602, in accordance with an aspect of the present disclosure, is shown.

Channels 402 allow continuous or periodic diffusion of cure inhibitor into cure inhibiting layer 202. As part 108 is produced, discrete amounts of cure inhibitor are utilized. The cure inhibitor utilization rate may be determined by observing the length of time assembler device 102 is in operation before portions of part 108 being produced or cure inhibiting layer 104 are damaged by increased separation forces. Damage occurs in forms including but not limited to: delamination of cure inhibiting layer 202 from support plate 204, deformation of new layer 128 being created, and increased torque placed on part 108 and/or build table 106. The cure inhibitor utilization rate may also be calculated by determining how many moles of cure inhibitor are required to minimize the separation force per unit volume of part 108 produced. In still other aspects, an estimate of the cure inhibitor utilization rate is made based on observation of assembler device 102 in operation.

The cure inhibitor utilization rate may be input into a computing device which controls the rate the cure inhibitor is provided to cure inhibiting layer 202. The computing device may be attached to the assembler device 102 and is accessible by the user. This computing device may also electronically control other portions of assembler device 102, such as actuator 130, light source 126, actuator 132, cure inhibitor source 602, or a regulator 604.

The cure inhibitor may be introduced into cure inhibiting layer 202 via at least one pathway 606 connected on an end portion to at least one inhibitor channel 402. Pathway 606 is connected to a regulator 604 and cure inhibitor source 602 at another end portion. Cure inhibitor source 602 may be an oxygen source such as a reservoir containing compressed oxygen, compressed air. Cure inhibitor source 602 may also be a reservoir containing some other gaseous cure inhibitor. Cure inhibitor source 602 may also be an air compressor which takes in the surrounding atmosphere and outputs that atmosphere at a desired pressure into pathway 606. Cure inhibitor source 301 may also be a baffle configured to control or prevent the flow of the surrounding atmosphere into pathway 606. A computing device may control the rate at which cure inhibitor source 606 provides cure inhibitor to cure inhibiting layer 202. This rate may be a function of the cure inhibitor utilization rate. The user may also control the rate at which cure inhibitor source 602 provides cure inhibitor to cure inhibiting layer 202 via electronic control, physical control, or some other means that will be apparent to those skilled in the relevant art(s) after reading the description herein.

Figure 7:
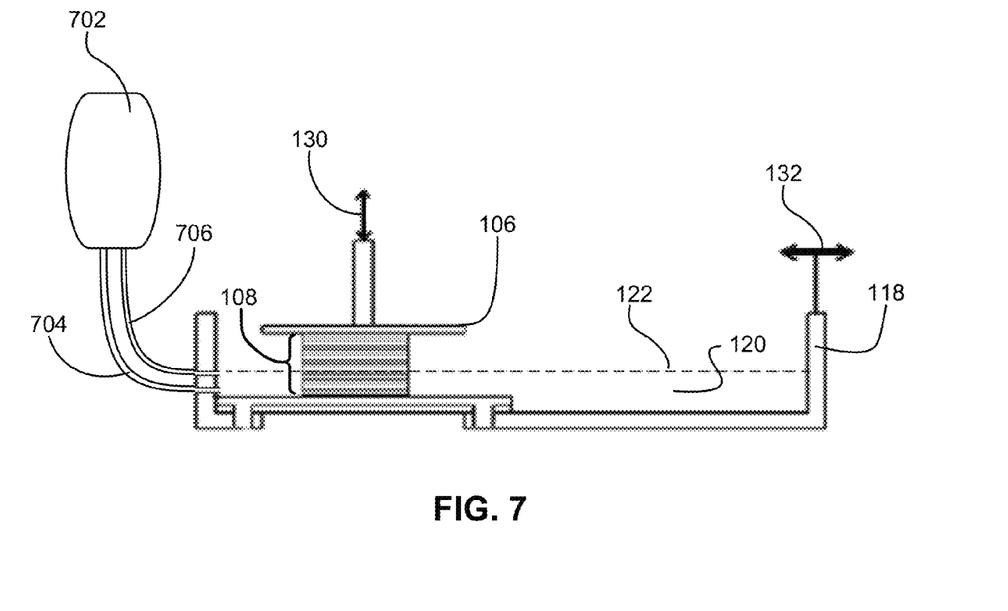
FIG. 7 is a schematic side view of an assembler device comprising a resin reserve, in accordance with an aspect of the present disclosure.

Referring now to FIG. 7, a schematic side view of assembler device 102 comprising a resin reserve 702, in accordance with an aspect of the present disclosure, is shown.

A constant level of resin 120 in reservoir 118 may be maintained. Among other reasons, a constant level of resin 120 ensures that part 108 is not completely removed from resin during any translations made while constructing part 108. Resin 120 may be maintained at a level corresponding with fill line 122 (shown as a dashed line in FIG. 7). Resin 120 depth may be a multiple of layer thickness.

The level of resin 120 may be maintained by filling reservoir 118 with more resin 120 as part 108 is created. Additional resin 120 may be stored in a resin reserve 702. Resin reserve 702 is a container configured to hold additional resin 120 which may refill reservoir 118 as desired by the user. Resin reserve 702 may contain sufficient resin 120 to produce one additional part 108. In an alternative aspect, resin reserve 702 contains sufficient resin to produce multiple additional parts.

Resin reserve 702 may be connected to reservoir 118 via a delivery tube 704 which interfaces with resin reserve 702 at the bottom of resin reserve 702. Delivery tube 704 is connected to reservoir 118 at a point below the fill line 122 of resin 120. To refill reservoir 118, resin flows from resin reserve 702 through delivery tube 704 into reservoir 118.

A return tube 706 connects the resin reserve 702 to the reservoir 118. Return tube 706 is connected to resin reserve 702 at the bottom of resin reserve 702. Return tube 706 is connected to reservoir 118 at fill line 122 of reservoir 118 such that if the level of resin 120 in the reserve falls below fill line 122, atmosphere enters return tube 706 and allows resin to flow from resin reserve 702 into reservoir 118 via delivery tube 704 until reservoir 702 is filled at or above fill line 122. Resin reserve 702 may also fill reservoir 118 via an electronically-controlled pump.

Figure 8:
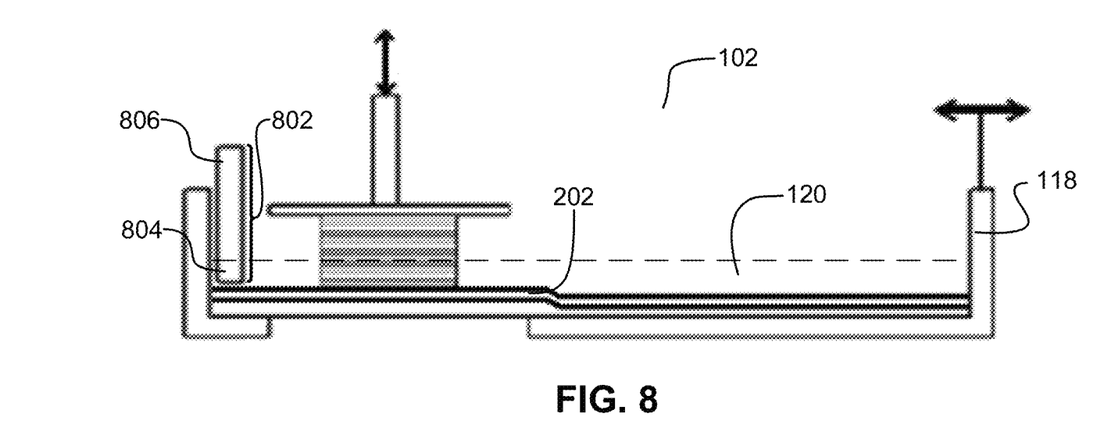
FIG. 8 is a schematic side view of an assembler device comprising a sweeper, in accordance with an aspect of the present disclosure.

Referring now to FIG. 8, a schematic side view of assembler device 102 comprising a sweeper 802, in accordance with an aspect of the present disclosure, is shown.

In an aspect comprising reservoir 118, a layer of resin 120 is present above cure inhibiting layer 202. Cure inhibiting layer 202 is not exposed to the surrounding atmosphere because on the top surface of cure inhibiting layer 202, where resin 120 contacts cure inhibiting layer 202, resin 120 prevents the atmosphere surrounding assembler device 102 from contacting cure inhibiting layer 202. Over time, the cure inhibiting layer 202 loses effectiveness because cure inhibitors, such as oxygen, present in the cure inhibiting layer are absorbed by resin 120. Reduction in cure inhibiting layer 202 efficiency results in an increase in the bonding force between image plate 104 and part 108, which may lead to damage of cure inhibiting layer 202 and damage to part 104 due to distortion or damage of newly formed layers 128.

Exposing cure inhibiting layer 202 to the atmosphere or a source of cure inhibitor allows cure inhibitor to permeate cure inhibiting layer 202, replenishing cure inhibiting layer 202 with the cure inhibitor, thereby maintaining the ability of cure inhibiting layer 202 to inhibit the curing of resin 120 in a microscopic layer on surface 116 of cure inhibiting layer 202. This allows part 108 to be easily removed from image plate 104 over a substantial number of cure cycles.

Sweeper 802 is configured to expose a portion of cure inhibiting layer 202 to a cure inhibitor source, such as the surrounding atmosphere, so that cure inhibiting layer 202 may be replenished with cure inhibitor. Sweeper 102 may be configured to expose a portion of cure inhibiting layer 202 each cure cycle by restricting or preventing the flow of resin 120 over a portion of cure inhibiting layer 202.

Figure 9:
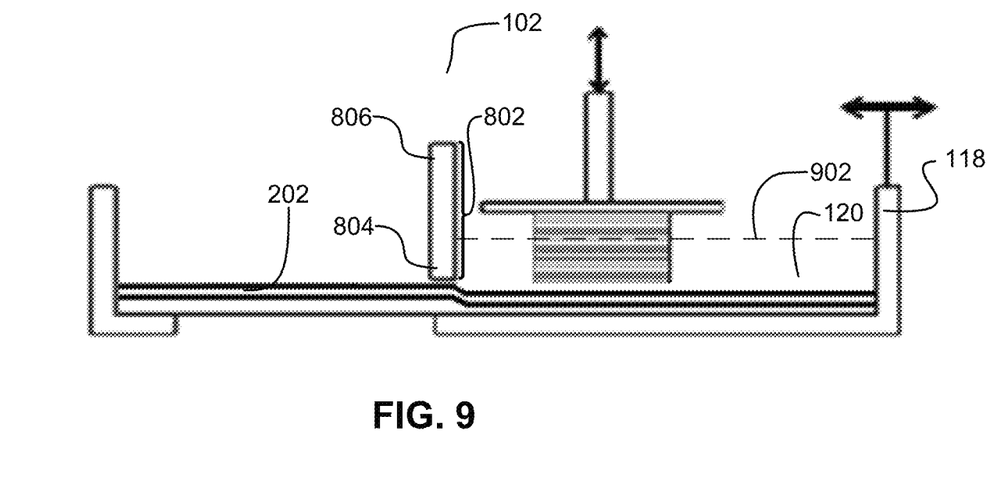
FIG. 9 is a schematic side view of an assembler device comprising a sweeper wherein the position of the build table and the image plate 104 have moved relative to one another, in accordance with an aspect of the present disclosure.

In an aspect, sweeper 802 may be configured as a moveable wall. Reservoir 118 moves relative to sweeper 802, creating an area of variable volume within reservoir 118, as shown in FIGS. 8 and 9. Sweeper 802 comprises a first sweeper portion 804 and a second sweeper portion 806. Sweeper 802 is positioned across a side of reservoir 118 and cure inhibiting layer 120. Sweeper 802 may be horizontally-fixed relative to build table 106. In such a configuration, sweeper 802 and build table maintain their relative horizontal positions while reservoir 118 slides beneath sweeper 802 and build table 106.

First sweeper portion 804 is proximally located to cure inhibiting layer 202. First sweeper portion 804 may be in physical contact with cure inhibiting layer 202, forming a resin-tight seal. First sweeper portion 804 may further comprise a rubber bumper, squeegee, or other semi flexible member configured to impede or prevent the flow of resin 120 at the interface of sweeper 802 and cure inhibiting layer 120. First sweeper portion 804 may further be configured to wipe away, move, or remove debris from cure inhibiting layer 202 when the debris comes into contact with sweeper 802. Debris may be cured resin 120, dirt, and other contaminants.

Second sweeper portion 806 may be a solid member, configured to impede the flow of resin 120. Second sweeper portion 806 may be a solid panel which completely constrains resin 120 within a space defined by sweeper 802, reservoir base and reservoir walls. Second sweeper portion 806 may be a panel comprising a cavity which allows liquid resin 120 to flow from one side of sweeper 802 to the other side. This configuration stirs resin 120 as it passes over through sweeper 802 which facilitates maintaining the mixture of resin 120, especially desirable where resin 120 comprising pigments or metal powders are utilized.

Sweeper 802 may be retained by a retaining means (not shown) such as a pin, spring, screw, bolt and the like.

Sweeper 802 may be configured to restrict resin 120 contained in reservoir 118 to a volume having a smaller footprint than the footprint of reservoir 118. In another aspect, assembler device 102 is configured such that sweeper 802 in combination with reservoir 118 may restrict resin 120 to an area where resin 120 does not contact high elevation area 112.

Cure inhibiting layer 202 may be exposed to a source of cure inhibitor for an amount of time which is effective for maintaining a concentration of cure inhibitor in the cure inhibiting layer 202 sufficient to maintain the ability of cure inhibiting layer 202 to inhibit the curing of resin 120 in a microscopic layer on surface 116. In an aspect, assembly device 102 causes cure inhibiting layer 202 to be exposed to a source of cure inhibitor by pausing for one-half second to five seconds when part 108 is adjacent to a portion of low elevation area 114. High elevation area 112 comprises cure inhibiting layer 202. Sweeper 802 is configured to prevent the flow of resin 120 on to high elevation area 112, such that cure inhibiting layer 202 may be replenished with cure inhibitors present through, for example, diffusion.

In another aspect, cure inhibiting layer 202 is replenished with cure inhibitor at a constant rate via channel 402. Multiple means for providing cure inhibitor to cure inhibiting layer 202 may be utilized in assembler device 102. For example, assembler device 102 may comprise sweeper 802, and channel 402.

Referring now to FIG. 9, a schematic side view of assembler device 102 comprising sweeper 802 wherein the position of build table 106 and image plate 104 have moved relative to one another, in accordance with an aspect of the present disclosure, is shown.

When reservoir 118 slides relative to sweeper 802 and build table 106, resin 120 is constrained by sweeper 802 to low elevation area 114, as indicated by resin level 902 (shown as a dashed line in FIG. 9). This exposes a portion of cure inhibiting layer 202 to the surrounding atmosphere.

Where (as in FIGS. 4, 6, and 7) only a portion of reservoir 118 base comprises image plate 104, assembler device 102 may be configured such that sweeper 802 in combination with reservoir 118 may restrict resin 120 to an area where resin 120 does not contact image plate 120. Sweeper 802 is configured to expose a portion of cure inhibitor later 202 to the surrounding atmosphere by preventing the flow of resin 120 on to the portion of cure inhibiting layer 202 when that portion of cure inhibiting layer 120 has shifted to a position outside of the resin-tight volume defined in part by sweeper 802.

Figure 10:
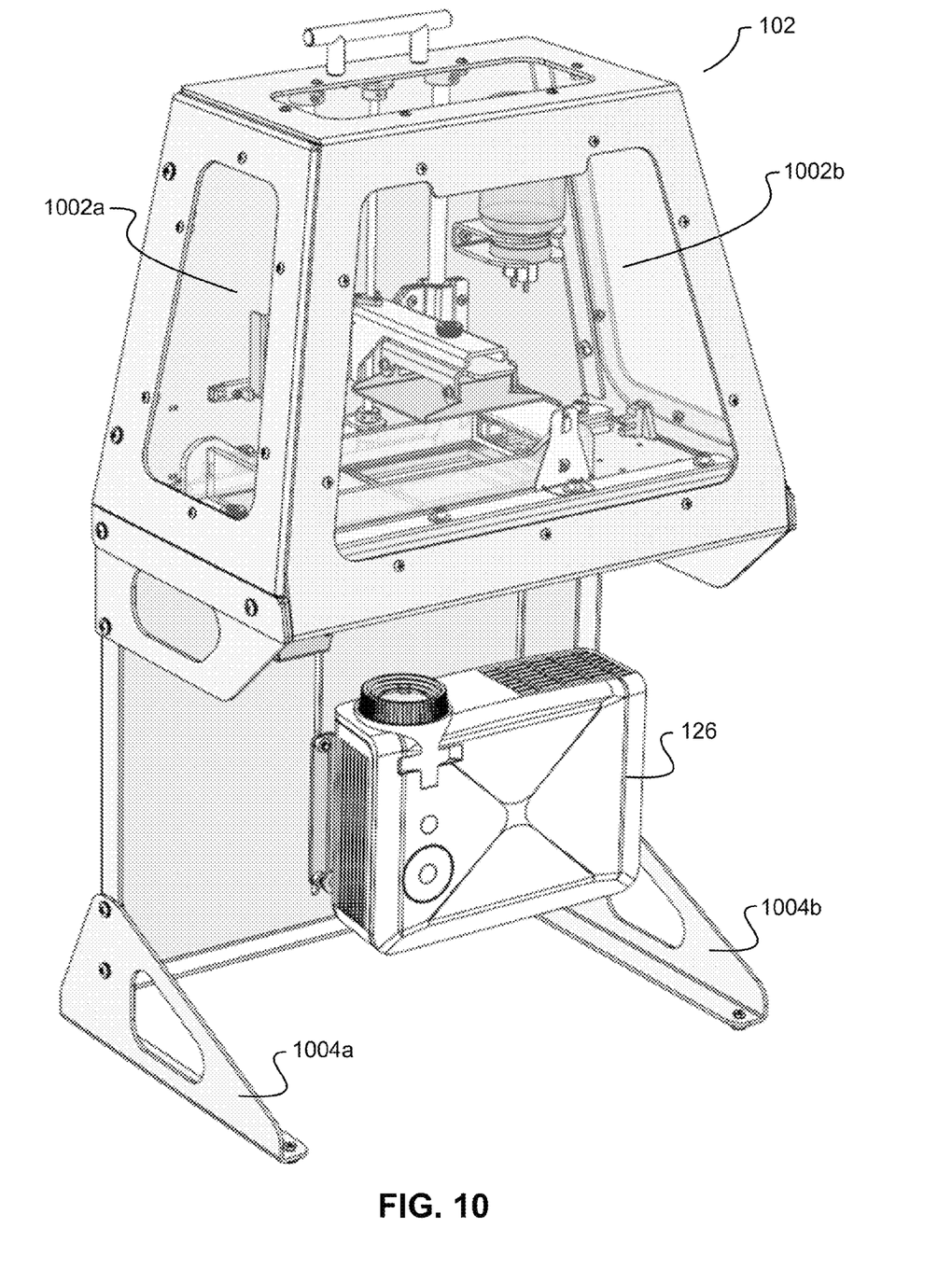
FIG. 10 is a perspective view of an assembler device, in accordance with an aspect of the present disclosure.

Referring now to FIG. 10, a perspective view of assembler device 102, in accordance with an aspect of the present disclosure, is shown.

Photopolymer resin 120 used in photolithographic assembler devices may harden and cure when exposed to specific wavelengths of light. Light capable of curing resin 120 originates from desirable sources, such as projector 126, and undesirable sources, such as the surrounding environment. Assembler device 102 may comprise one or more windows 1002 (shown as windows 1002a-b in FIG. 10, for clarity) made of semi-transparent materials which enclose portions of assembler device 102 in order to avoid exposing resin 120 contained therein to visible, near UV and UV light radiation which cures resin 120. Red windows may be chosen which prevent the transmission of higher frequency visible light radiation.

In some aspects of the present disclosure, it is desirable for assembler device 102 to be of a compact, stand-alone form factor. Thus, feet 1004 are provided which allow assembler device 102 to rest on a substantially uniform flat surface. In some aspects, feet 1004 are adjustable, having rubber shims attached to the bottom such that the feet can be adjusted to provide a level stable base for assembler device 102. Feet 1004 may be removable.

Figure 11:
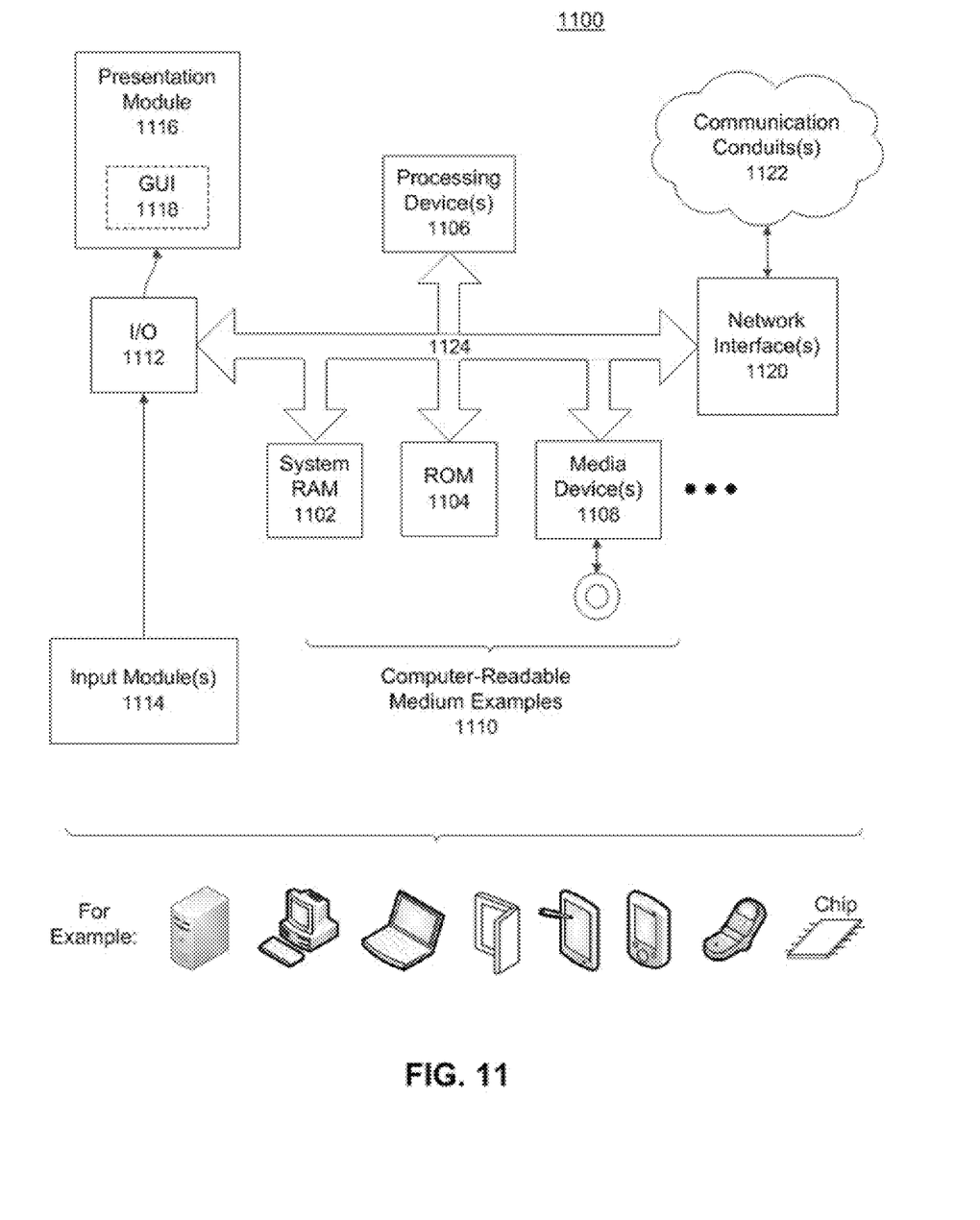
FIG. 11 is a block diagram illustrating an exemplary computer system useful for implementing an aspect of the present disclosure.

Referring now to FIG. 11, a block diagram illustrating an exemplary computer system useful for implementing an aspect of the present disclosure, is shown.

FIG. 11 sets forth illustrative computing functionality 1100 that may be used to implement any aspect of the functions described herein. For example, computing functionality 1100 may be used to implement any aspect of the present disclosure including but not limited to, moving image plate 104 via actuator 132, moving build table 106 via actuator 130, choosing an appropriate image 124 to cure layer 128, causing light source 126 to produce image 124 for an effective amount of time in order to cure layer 128 and other aspects as will become apparent to those having skill in the relevant art(s) upon reading the description herein. In all cases, computing functionality 1100 represents one or more physical and tangible processing mechanisms.

Computing functionality 1100 may cause actuator 130 to lift or lower build plate 106 a distance greater than the thickness, t, of a new layer 128 being formed.

Computing functionality 1100 may include volatile and non-volatile memory, such as RAM 1102 and ROM 1104, as well as one or more processing devices 1106 (e.g., one or more central processing units (CPUs), one or more graphical processing units (GPUs), and the like). Computing functionality 1100 also optionally includes various media devices 1108, such as a hard disk module, an optical disk module, and so forth. Computing functionality 1100 may perform various operations identified above when the processing device(s) 1106 executes instructions that are maintained by memory (e.g., RAM 1102, ROM 1104).

More generally, instructions and other information may be stored on any computer readable medium 1110, including, but not limited to, static memory storage devices, magnetic storage devices, and optical storage devices. The term "computer readable medium" also encompasses plural storage devices. In all cases, computer readable medium 1110 represents some form of physical and tangible entity. By way of example, and not limitation, computer readable medium 1110 may comprise "computer storage media" and "communications media."

"Computer storage media" include volatile and non-volatile, removable and non-removable media implemented in any method or technology for storage of information, such as computer readable instructions, data structures, program modules or other data. Computer storage media include, but are not limited to, RAM 1102, ROM 1104, EEPROM, Flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable medium.

Computing functionality 1100 also includes an input/output module 1112 for receiving various inputs (via input modules 1114), and for providing various outputs (via one or more output modules). One particular output mechanism may include a presentation module 1116 and an associated GUI 1118. Computing functionality 1100 may also include one or more network interfaces 1120 for exchanging data with other devices via one or more communication conduits 1122. One or more communication buses 1124 communicatively couple the above-described components together.

Communication conduit(s) 1122 may be implemented in any manner (e.g., by a local area network, a wide area network (e.g., the Internet), and the like, or any combination thereof). Communication conduit(s) 1122 can include any combination of hardwired links, wireless links, routers, gateway functionality, name servers, etc., governed by any protocol or combination of protocols.

Alternatively, or in addition, any of the functions described herein can be performed, at least in part, by one or more hardware logic components. For example, without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The terms "module" and "component" as used herein generally represent software, firmware, hardware, or combinations thereof. In the case of a software implementation, the module or component represents program code that performs specified tasks when executed on a processor. The program code can be stored in one or more computer readable memory devices, as described with reference to FIG. 11 The features of the present disclosure described herein are platform-independent, meaning that the techniques can be implemented on a variety of commercial computing platforms having a variety of processors (e.g., desktop, laptop, notebook, tablet computer, personal digital assistant (PDA), mobile telephone, smart telephone, gaming console, and the like).

In some aspects, assembler device 102 is controlled by a computing functionality 1100 containing a software program. Computing functionality is connected to at least a portion of assembler device 102 for communication therewith and capable of controlling portions of assembler device 102 in order to facilitate production of one or more parts 108.

The software program may comprise an assembler device 102 application programming interface (API), a printer driver, and a translator. The assembler device 102 may be a 3D printer API. The 3D printer API allows the computer to command the mechanical operation of the functions of assembler device 102. The print driver controls assembler device and outputs cross sectional images 124 to the projector 126, which creates part 108.

Printer driver may control the actuator 130 and actuator 132 in order to alter the relative positions of build table 106 and image plate 104. Printer driver may also control the level of resin 120 in reservoir 118 and the cure inhibitor flow rate where assembler device 102 further comprises such portions.

The translator converts a 3D part file, such as a .stl file, and "slices" it up into the desired image layers. The translator module may identify areas of an image layer which need additional physical support. In an aspect, the translator draws any required supporting structures needed to facilitate successful creation of the part 108.

Computing functionality 1100 may further comprise one or more fail safe modules which automatically power off actuator 130 or actuator 132 the software controlling assembler device 102 attempts to drive a portion of assembler device 102 past its operational limits. For example, if printer commands the actuator 130 to move the build table 106 to a position which would damage part 108 or the build table 106 itself, the fail safe module(s) would prevent that movement.

A manufacturer or supplier of assembler device 102 may make a 3D printer API available such that users (La, developers) may develop software that can be executed on a "host" computer (computing device 1100) and communicate with assembler device 102 to control the printing process.

Figure 12:
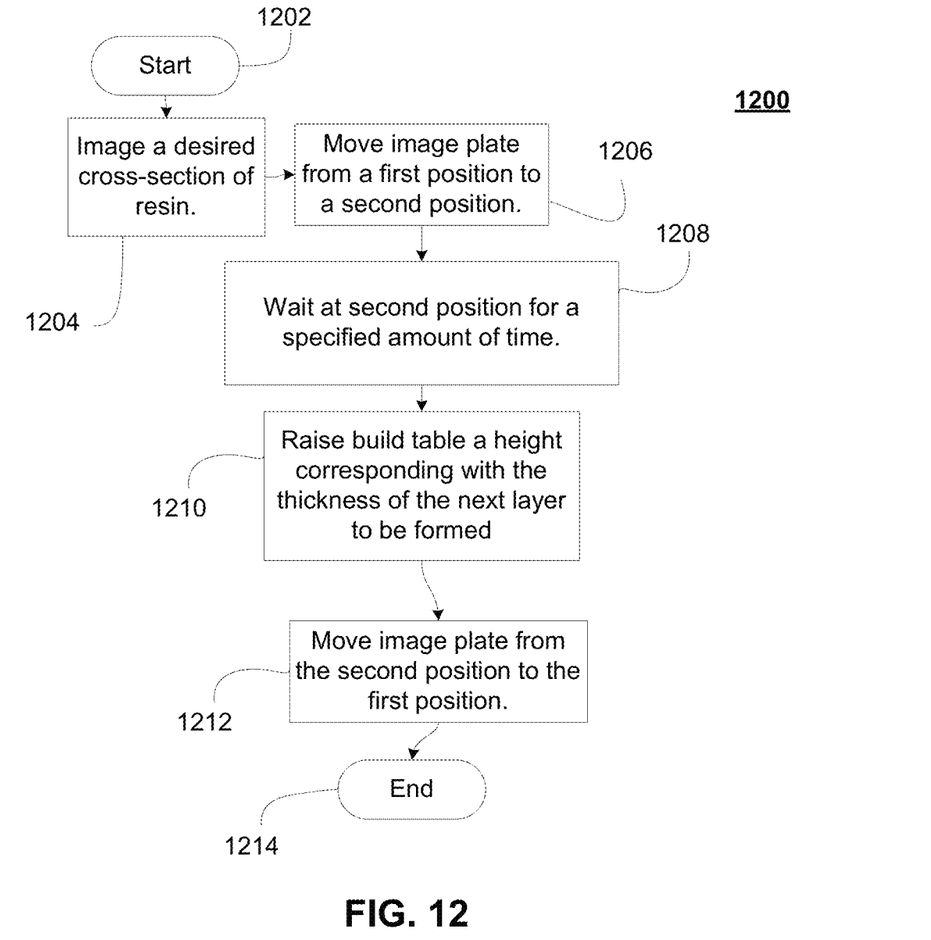
FIG. 12 is a block diagram of a process for operating an assembler device, in accordance with an aspect of the present disclosure.

Now referring to FIG. 12, a block diagram of a process 1200 for operating assembler device 102, in accordance with an aspect of the present disclosure, is shown.

Part 108 production process 1200 may be partially or completely facilitated by computing functionality 1100 via modules designed by a manufacturer or supplier of assembler device 102, via modules designed by the user, or some combination thereof.

Process 1200 begins at step 1202 and immediately proceeds to step 1204.

In step 1204, computing functionality 1100 directs light source 126 to project an image 124 onto image area 502 of image plate 104 corresponding with the cross section of new layer 128 to be cured and added to part 108 being constructed. Upon completion of step 1204, step 1206 begins.

Image plate 104 is configured to slide between a position where part 108 is over high elevation area 112 to a position where part 108 is over low elevation area 114. In step 1206 image plate 1204 is translated horizontally from a first position over high elevation area 112 until part 108 is in a position where part 108 is at a second position over low elevation area 114.

Upon completion of step 1206, step 1208 is executed. Image plate 104 is held in the second position (for example, a position where part 108 is over low elevation area 114) for a specified amount of time. The amount of time may be approximately 1 second, chosen to allow cure inhibiting layer 202 to reoxygenate via exposure to the atmosphere by sweeper 802. The wait time may be determined by the operational limitations of assembler device 102 or by the curing properties of the material used to construct part 108.

Upon completion of step 1208, step 1210 is executed. Build table 106 is raised to a new height corresponding with the thickness of the next layer 110 to be formed. Actuator 130 may be used to accomplish this step.

Upon completion of step 1210, step 1212 is executed. Image plate 1204 is translated horizontally from a second position over low elevation area 114 until part 108 is in a first position where part 108 is over high elevation area 112.

Upon completion of step 1212, step 1214 is executed, where process 1200 ends. Process 1200 may be repeated until part 18 is fully assembled.

While various aspects of the present disclosure have been described above, it should be understood that they have been presented by way of example and not limitation. It will be apparent to persons skilled in the relevant art(s) that various changes in form and detail can be made therein without departing from the spirit and scope of the present disclosure. Thus, the present disclosure should not be limited by any of the above described exemplary aspects.

In addition, it should be understood that the figures in the attachments, which highlight the structure, methodology, functionality and advantages of the present disclosure, are presented for example purposes only. The present disclosure is sufficiently flexible and configurable, such that it may be implemented in ways other than that shown in the accompanying figures.

What is claimed is:

1. An assembler device for constructing a three-dimensional part in a layer-wise fashion from liquid resin wherein a layer has a cross-section and a thickness, the device comprising:
   an image plate comprising:
   a top image plate surface;

a bottom image plate surface;
a high elevation area; and
a low elevation area;
wherein the image plate provides for layer-wise construction of the part on the top image plate surface at one of the high elevation area and the low elevation area, the high elevation area and the low elevation area each comprise a width for constructing the part;
a cure inhibiting layer located on an area of the top image plate surface to prevent curing of an adjacent volume of liquid resin;
a build table located adjacent to the image plate, wherein the build table comprises:
a table portion to receive the part being constructed,
wherein the vertical distance between the image plate and the part being constructed may be altered by sliding the part between a first part position over the high elevation area and a second part position over the low elevation area; and
a sweeper, the sweeper comprising:
a first sweeper portion; and
a second sweeper portion;
wherein the image plate is slidable between a first image plate position and a second image plate position;
wherein the first sweeper portion extends to a top of the cure inhibiting layer to be in contact with the cure inhibiting layer, the sweeper is positioned across a side of the cure inhibiting layer such that the image plate slides in a single plane relative to the sweeper to retard the flow of liquid resin when the first sweeper portion contacts the cure inhibiting layer, to expose at least a portion of the cure inhibiting layer to the atmosphere, and remove debris from the cure inhibiting layer when the debris comes into contact with the sweeper as the image plate slides between the first image plate position and the second image plate position.

2. The assembler device of claim 1, wherein the part is constructed of layers of a thickness, t, and the high elevation area is at least one thickness t higher that the low elevation area.

3. The assembler device of claim 1, wherein the part is constructed of layers of a thickness, t, and the high elevation area is more than one thickness t higher that the low elevation area.

4. The assembler device of claim 1, wherein the part is constructed from liquid resin by curing selected portions of the liquid resin via exposure to light, the device further comprising:
a light source with an output directed toward the bottom image plate surface, the light source configured to cure successive layers of the part,
wherein the high elevation area is transparent and configured to allow light to pass through the bottom image plate surface the top image plate surface of the high elevation area where a layer of liquid resin may be deposited on the image plate and cured by the light, constructing a layer of a part.

5. The assembler device of claim 1, further comprising:
a reservoir comprising:
a reservoir bottom;
wherein the reservoir is connected to the assembler device and configured to hold liquid resin and supply at least one layer of liquid resin to the image plate.

6. The assembler device of claim 5, wherein the reservoir bottom further comprises the image plate, the reservoir is located below the build table, and the reservoir is configured for movement relative to the build table.

7. The assembler device of claim 6, further comprising:
an actuator connected to the reservoir and configured to slide the reservoir between a first reservoir position wherein the build table is adjacent to the high elevation area and a second reservoir position wherein the build table is adjacent to the low elevation area.

8. The assembler device of claim 5, further comprising:
a resin reserve comprising:
a container; and
a delivery channel;
wherein the container is configured to hold an additional volume of liquid resin, the delivery channel is connected to the reservoir such that the liquid resin can flow from the container to the reservoir, and the resin reserve is configured to maintain the volume of liquid resin in the reservoir within a specified range.

9. The assembler device of claim 1, further comprising:
an actuator;
wherein the actuator is connected to the build table and configured to move the build table with respect to the image plate.

10. The assembler device of claim 5, wherein the first sweeper portion stirs the resin contained within the reservoir.

11. The assembler device of claim 1, wherein the cure inhibiting layer is at least one millimeter thick.

12. The assembler device of claim 1, wherein the cure inhibiting layer is removably connected to the assembler device.

13. The assembler device of claim 1, wherein the second sweeper portion further comprises:
a cavity;
wherein the cavity is configured to allow liquid resin to pass from a first side of the sweeper to a second side of the sweeper through the cavity.

14. The assembler device of claim 1, wherein the first sweeper portion contacts the top image plate surface to remove debris from the top image plate surface.

15. The assembler device of claim 1, the device further comprising:
a cure inhibitor source that is supplied a cure inhibitor to the cure inhibiting layer.

16. The assembler device of claim 15, wherein the cure inhibitor source provides oxygen to the cure inhibiting layer.

17. The assembler device of claim 15, wherein the cure inhibitor source comprises:
an oxygen source, the oxygen source comprising:
an opening;
a regulator, the regulator comprising:
an inlet; and
an outlet;
a pathway, the pathway comprising:
a first portion; and
a second portion;
wherein the inlet is connected to the opening for receiving oxygen from the oxygen source and the regulator is configured to selectively release an amount of oxygen at the outlet and the pathway is connected to the outlet at the first portion for receiving oxygen from the regulator, the first portion is configured to allow oxygen to flow from the first portion to the second portion, and the second portion is configured to introduce the oxygen to the cure inhibiting layer.

18. The assembler device of claim 15, further comprises:
at least one channel comprising:
a first channel portion; and
a second portion;

wherein the channel is connected on a first channel portion to the cure inhibiting layer, the second channel portion of the channel is exposed to the atmosphere, and the channel allows atmosphere, as the cure inhibitor source, to enter h second channel portion and flow to the cure inhibiting layer via the first channel portion.

19. An assembler device for constructing a three-dimensional part in a layer-wise fashion from liquid resin wherein a layer has a cross-section and a thickness, the device comprising:
   an image plate comprising a top surface and a bottom surface with the image plate further comprising a first elevation area and a second elevation area, each elevation area is of a width to construct a part on the top image plate surface at either the first elevation area or the second elevation area;
   a reservoir with the image plate forming a bottom of the reservoir, resin is held within the reservoir;
   a cure inhibiting layer located on an area of the top image plate surface to prevent curing of an adjacent volume of liquid resin;
   a build table located adjacent to the image plate, the build table comprises a table portion to receive the part being constructed,
   wherein the vertical distance between the image plate and the part being constructed is altered by sliding the part between a first part position over the high elevation area and a second part position over the low elevation area; and
   a sweeper to retard a liquid resin located on the cure inhibiting layer by the sweeper being placed in contact with the cure inhibiting layer to expose at least a portion of the cure inhibiting layer to the atmosphere, remove debris from the cure inhibiting layer, stir the resin contained within the reservoir and remove debris from the cure inhibiting Layer.

20. The assembler device according to claim 19, wherein the sweeper further comprises:
   a first sweeper portion; and
   a second sweeper portion;
   wherein the first sweeper portion is in contact with the cure inhibiting layer, the sweeper is positioned across a side of the cure inhibiting layer to retard the flow of liquid resin to expose at least a portion of the cure inhibiting layer to the atmosphere, and remove debris from the cure inhibiting layer when the debris comes into contact with the sweeper as the image plate slides in a single plane between the first image plate position and the second image plate position.

* * * * *